United States Patent
Luner et al.

(10) Patent No.: US 7,065,897 B2
(45) Date of Patent: Jun. 27, 2006

(54) FASTENER GRIP LENGTH SELECTOR

(75) Inventors: Jeffery J. Luner, Collinsville, IL (US); Leslie A. Hoeckelman, O'Fallon, MO (US); David W. Kleine, St. Charles, MO (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 10/979,331

(22) Filed: Nov. 2, 2004

(65) Prior Publication Data

US 2006/0090363 A1    May 4, 2006

(51) Int. Cl.
*G01B 3/22* (2006.01)
*G01B 5/12* (2006.01)
*G01M 19/00* (2006.01)

(52) U.S. Cl. .............................. 33/836; 33/701; 33/794; 29/407.05

(58) Field of Classification Search .................. 33/833, 33/836, 545, 556, 572, 701, 567, 502, 791, 33/792, 794; 29/407.05, 897.2; 73/1.79, 73/1.81
See application file for complete search history.

(56) References Cited

U.S. PATENT DOCUMENTS

| | | | | | |
|---|---|---|---|---|---|
| 157,562 | A | * | 12/1874 | Windle et al. ............... | 408/202 |
| 2,181,077 | A | * | 11/1939 | Street ........................... | 33/556 |
| 2,357,024 | A | * | 8/1944 | Robins ......................... | 33/556 |
| 2,615,234 | A | * | 10/1952 | Dumbleton ................... | 29/462 |
| 2,642,670 | A | * | 6/1953 | Dow .............................. | 33/531 |
| 2,678,502 | A | * | 5/1954 | Pistoles ........................ | 33/836 |
| 3,197,877 | A | * | 8/1965 | Aldeborgh ................... | 33/542 |
| 3,479,743 | A | * | 11/1969 | Zemberry ..................... | 33/836 |
| 3,624,913 | A | * | 12/1971 | Ciampolini ................... | 33/701 |
| 3,742,584 | A | * | 7/1973 | Marcoux et al. .......... | 29/407.05 |
| 3,826,010 | A | * | 7/1974 | Finley .......................... | 33/836 |
| 4,216,585 | A | * | 8/1980 | Hatter ......................... | 33/836 |
| 4,219,936 | A | * | 9/1980 | Bridges ....................... | 33/534 |
| 4,577,412 | A | * | 3/1986 | McKinney ................... | 33/701 |
| 4,905,378 | A | * | 3/1990 | Culver et al. ................. | 33/836 |
| 5,077,909 | A | * | 1/1992 | Cranor ........................ | 33/607 |
| 5,170,569 | A | * | 12/1992 | Anderson ..................... | 33/506 |
| 5,189,808 | A | * | 3/1993 | Evans et al. .................. | 33/836 |
| 5,497,560 | A | * | 3/1996 | Pasquerella et al. .......... | 33/836 |
| 5,535,498 | A | * | 7/1996 | Roberts et al. .......... | 29/407.05 |
| 5,893,203 | A | * | 4/1999 | Buttrick Jr. .............. | 29/407.05 |
| 5,979,069 | A | * | 11/1999 | Hayashida et al. ........... | 33/556 |
| 6,044,573 | A | * | 4/2000 | Cockrill ....................... | 33/836 |
| 6,446,348 | B1 | * | 9/2002 | Brian .......................... | 33/532 |
| 6,694,832 | B1 | * | 2/2004 | Gleeson ..................... | 73/866.5 |

* cited by examiner

*Primary Examiner*—R. Alexander Smith
(74) *Attorney, Agent, or Firm*—Shimokaji & Associates, P.C.

(57) ABSTRACT

A fastener grip length selector includes a housing having a first section and a second section, and a gauge fitted with the second section of the housing and including a spindle that reaches into the first section of the housing. The fastener grip length selector enables the precise determination of a grip length of a fastener to be installed in a particular fastener hole while a temporary fastener is installed in that particular fastener hole. The fastener grip length selector is suitable for, but not limited to, applications in the aerospace industry. The fastener grip length selector may be used, for example, during the installation process of an aircraft airframe assembly. Using the method for precisely measuring a thickness of an assembly in clamped-up condition enables the determination of the length of a blind fastener hole with high accuracy while a temporary fastener is installed.

30 Claims, 5 Drawing Sheets

FASTENER GRIP LENGTH SELECTOR

BACKGROUND OF THE INVENTION

The present invention generally relates to structural fasteners and length measurements, more particularly, to a fastener grip length selector, and to a method for precisely measuring an assembly thickness in a clamped-up condition.

Structural fasteners come in varying length to accommodate any thickness of structures. The thickness of an assembly may vary over an area and, consequently, each hole where a fastener is to be installed needs to have its length measured in order to select and install the correct length fastener. Selecting the correct grip length of a fastener is critical in many applications, such as aircraft airframe installation. If a structural fastener is used that does not have the correct length, it may not be possible to install the fastener correctly and the joint strength may be reduced. To ensure the correct installation of fasteners, numerous types of measuring devices are available to measure the length of the hole where the fastener is to be installed. Typically, such measuring devices are gauges that include a measuring scale and that are formed like a fishhook. Such gauges can be hooked onto the backside of a fastener hole, and the number at the scale that is even with the front side of the assembly indicates the length of the hole. Usually, if the reading is between increments, the next higher increment is used for the selection of the fastener to be installed in this hole. The gauging process of the fastener holes is typically done manually.

Prior art gauges may include, for example, a grip length gauge and a digital gauge. The grip length gauge is simply a flat metal blade with a hook on the end. The gauge is inserted through a hole so that the hook contacts the inner mold line surface of an assembly. The metal shaft extends through the top of the hole. On the side of the shaft are markings that correspond to the grip length of the hole. The shortcoming of this gauge is that the outer mold line surface of the assembly must be visually aligned to the markings on the shaft, allowing for errors. The digital gauge may include a spindle that has a contact at the end. The contact may resemble a hook. The spindle is inserted through the hole until the clamping shaft of the gauge rests on the outer mold line of the assembly. The gauge is positioned such that the contact rests on the inner mold line surface of the assembly. The grip length is then the distance from the hook to the clamping shaft. The shortcoming is that the assembly is not in a clamped-up condition at this hole, and that the spindle mechanism can become contaminated with excess liquid shim that has been squeezed into the hole, which is not desirable.

In an installation process, for example, the installation of an aircraft airframe, the step of measuring the length of fastener holes is a very important step to ensure the correct selection of the permanent fastener grip length and the correct installation of permanent fasteners, but it is also a time consuming step that slows the product flow. Furthermore, should a fastener be installed incorrectly because of use of an incorrect fastener length, the fastener would need to be removed and replaced, resulting in significant rework and potential damage to the assembly.

Many assemblies, for example, in the aerospace industry or in the automobile industry, require temporary fasteners to be installed. Temporary fasteners hold the material in place until it is ready to be fastened permanently. Temporary fasteners are typically installed in assemblies that consist of a plurality of panels, such as a skin, a sealer or shim, and a substructure, for example, an aircraft airframe assembly. In an installation process, for example, of an aircraft airframe assembly, temporary fasteners may be inserted into fastener holes in a first step. The temporary fasteners might need to be removed one by one and the length of each fastener hole might need to be measured in a subsequent step before the permanent fastener can be selected and installed. This process is time consuming and increases the cycle time.

Figure 1:
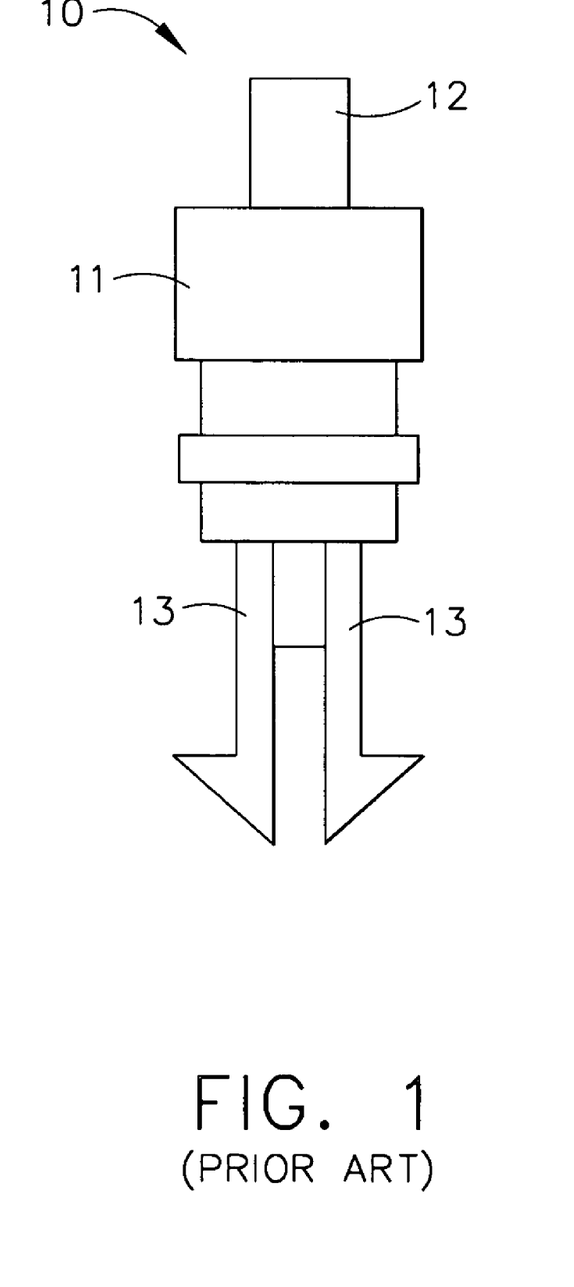
FIG. 1a is a schematic front view of a prior art temporary fastener.

Existing temporary structural fasteners include, for example, Wedgelock™ temporary fasteners manufactured by Monogram Aerospace Fasteners, Los Angeles, Calif., U.S.A. Wedgelock™ temporary fasteners are frequently used, for example, in the aircraft airframe installation process to temporarily hold an assembly, such as substructure, sealant, and outer mold line skin, together. The Wedgelock™ temporary fastener is similar to the temporary fastener 10 illustrated in FIG. 1. The temporary fastener 10, as illustrated in FIG. 1, is a temporary blind fastener that has a cylindrical body 11. The cylindrical design eliminates fastener-to-tool orientation problems. Still, the temporary blind fastener 10 does not necessarily need to be cylindrical—e.g. could be hexagonal, octagonal, etc. The temporary fastener 10 further includes a captive nut 12, double lead thread (not shown), and larger geometry bearing wires 13. Utilization of a captive nut 12 provides a positive disengagement, allowing unobstructed removal of the fastener even if used in wet sealant applications. The double lead thread design (not shown) further enhances overall installation and removal efficiency while the large bearing area makes this type of fastener the optimum choice for both composite and metallic structures. The temporary fastener 10 is a power operated reusable temporarily fastener and may be installed and removed manually, automatically, or by a robot. Using the prior art temporary fastener 10 may improve the installation and removal efficiency for temporarily fastening structures, but the temporary fastener 10 still needs to be removed from a structure to allow access to the fastener hole to be measured using a separate measuring device.

As can be seen, there is a need for a measuring device that enables accurate and efficient determination of a fastener hole length. Furthermore, there is a need to enable the measurement of a fastener hole while a temporary fastener is installed in this hole. Moreover there is a need to enable correct selection of the fastener grip length of the fastener to be installed.

There has, therefore, arisen a need to provide a length-measuring device that enables accurate determination of a fastener hole length without removal of the temporary fastener from the fastener hole. There has still further arisen a need to provide a method for precisely measuring the thickness of a temporarily fastened assembly and for selecting the correct fastener grip length for a fastener to be installed permanently.

SUMMARY OF THE INVENTION

The present invention provides a fastener grip length selector, and a method for precisely measuring an assembly thickness in a clamped-up condition. The present invention enables the precise determination of a grip length of a fastener to be installed in a particular fastener hole while a temporary fastener is installed in this hole. The present invention provides a fastener grip length selector that is suitable for, but not limited to, applications in the aerospace industry. The grip length selector as in one embodiment of the present invention may be used, for example, during the installation process of an aircraft airframe assembly.

In one aspect of the present invention, a fastener grip length selector comprises an axis, a housing extending along the axis and including a first section and a second section, and a gauge fitted with the second section of the housing. The gauge includes a spindle. The spindle extends along the axis and reaches into the first section of the housing.

In another aspect of the present invention, a fastener grip length selector comprises an axis, a cylindrical housing, and a gauge. The housing extends along the axis and includes a first section and a second section. The gauge includes a clamping shaft, a spindle, a spring, and a digital display. The clamping shaft has a cylindrical shape and extends the gauge along the axis. The clamping shaft is in a fixed connection with the second section of the housing. The spindle extends along the axis, reaches into the first section of the housing, and is movable within the clamping shaft along the axis. The spring is inserted in the clamping shaft, is in contact with the spindle, and is compressed with the spindle. The digital display displays a length corresponding to the movement of the spindle along the axis. The gauge translates the movement of the spindle into a length displayed in the digital display.

In still another aspect of the present invention, a calibration system comprises a reference standard, a temporary fastener, and a fastener grip length selector. The reference standard includes a structure including a top surface and a bottom surface, and a fastener hole machined into the structure. The structure has a known thickness measured from the top surface to the bottom surface. The fastener hole extends from the top surface to the bottom surface of the structure. The temporary fastener is installed in the fastener hole and includes a top. The fastener grip length selector is placed over the temporary fastener. The fastener grip length selector contacts the temporary fastener at the top. The fastener grip length selector contacts the top surface of the structure. The fastener grip length indicator indicates a length.

In a further aspect of the present invention, a system for measuring an assembly thickness in a clamped-up condition comprises an assembly including a plurality of panels, a fastener hole machined into the assembly, a temporary fastener installed in the fastener hole, and a fastener grip length selector including a housing and a gauge. The assembly has an outer mold line and an inner mold line. The temporary fastener includes a top and provides a clamp-up force to the assembly holding the panels together. The gauge includes a spindle. The fastener grip length selector is placed over the installed temporary fastener such that the housing is in contact with the outer mold line of the assembly and the spindle is in contact with the top of the temporary fastener. The gauge translates the movement of the spindle into a length.

In still a further aspect of the present invention, a system for measuring the thickness of an aircraft airframe assembly in clamped-up condition comprises an aircraft airframe assembly including an outer mold line skin, a sealer, and a substructure, a fastener hole machined into the aircraft airframe assembly, a temporary fastener installed in the fastener hole, a fastener grip length selector, and a reference standard having a known thickness and including a fastener hole. The assembly has an outer mold line, an inner mold line, and a thickness. The fastener hole is a blind hole not accessible from the inner mold line. The temporary fastener includes a top and provides a clamp-up force to the aircraft airframe assembly holding the outer mold line skin, the sealer, and the substructure together. The fastener grip length selector includes a gauge and a housing supporting the gauge. The gauge includes a spindle, a display, and a spring in connection with the spindle. The reference standard calibrates the fastener grip length selector. The fastener grip length selector is placed over the installed temporary fastener. The housing of the fastener grip length selector is in contact with the outer mold line of the assembly. The contact is in contact with the top of the temporary fastener and compresses the spring. The thickness of the aircraft airframe assembly is deduced from the gauge reading displayed in the display. The gauge reading displayed in the display is digitally converted to a corresponding fastener grip length.

In still another aspect of the present invention, a method for precisely measuring a thickness of an assembly in clamped-up condition comprises the steps of: calibrating a fastener grip length selector using a reference standard and a temporary fastener, installing the temporary fastener in an assembly having a thickness, placing the calibrated fastener grip length selector over the installed temporary fastener, making contact between the fastener grip length selector, the temporary fastener, and the assembly, reading a length displayed on the fastener grip length selector; and deducing the thickness of the assembly from the reading.

These and other features, aspects and advantages of the present invention will become better understood with reference to the following drawings, description and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Broadly, the present invention provides a fastener grip length selector, and a method for precisely measuring an assembly thickness in a clamped-up condition. Contrary to the known prior art, the present invention enables the precise determination of a grip length of a fastener to be installed in a particular fastener hole while a temporary fastener is installed in this hole. Currently, it is necessary to remove a temporary structural fastener holding an assembly together before a length-measuring device can be used to determine the length of a fastener hole and, consequently, the fastener grip length. The present invention provides a fastener grip length selector that is suitable for, but not limited to, applications in the aerospace industry. The fastener grip length selector as in one embodiment of the present invention may be used, for example, during the installation process of an aircraft airframe assembly.

In one embodiment, the present invention provides a fastener grip length selector that may be placed over an installed temporary fastener, for example, a Wedgelock™ temporary fastener manufactured by Monogram Aerospace Fasteners, Los Angeles, Calif., U.S.A. Such a prior art temporary fastener is shown in FIG. 1. The fastener grip length selector may measure the distance from the surface of the bearing wires 13 of the temporary fastener 10 that contact the inner mold line surface of the assembly to the outer mold line surface of an assembly that may be translated into the thickness of the assembly and the correct fastener grip length. In the known prior art it is necessary to remove the temporary fastener from the fastener hole before the length of the fastener hole or the grip length of the fastener can be determined.

In one embodiment, the present invention provides a gauge fitted within a gauge housing. The gauge housing as in one embodiment of the present invention may be placed over an installed temporary fastener and may support the gauge such that the gauge may be in contact with the top of the temporary fastener. Using the gauge as in one embodiment of the present invention while a temporary fastener applies a force to the panels of an assembly holding them tightly together and eliminating gaps between the panels enables the determination of the true thickness of the assembly and the true length the fastener hole. If the temporary fastener has to be removed from the assembly to determine its thickness as in prior art, gaps between the panels of the assembly may occur that may lead to errors in the determination of the length of the fastener hole. Furthermore, sealant and/or liquid shim that may be placed between panels may be squeezed into the hole. This excess compound may contaminate gauges currently used to measure grip length, since known prior art gauges need to be inserted the fastener hole to measure the fastener hole length. By placing the gauge housing as in one embodiment of the present invention over the installed temporary fastener and by determine the fastener hole length while the temporary fastener is installed, critical gauge components, such as the spindle, are not exposed to contamination by a sealant or liquid shim.

In one embodiment, the present invention provides a reference standard that may be used to calibrate the gauge and the temporary fastener. The calibration as in one embodiment of the present invention may allow the thickness of the assembly to be deduced from the gauge reading. The gauge reading may be converted to the correct grip length value of the fastener. By using a reference standard and by calibrating the gauge and the temporary fastener, the thickness of an assembly may be determined with a higher accuracy than by using prior art measuring devices, such as the grip length gauge, that do not use a reference standard. In one embodiment, the present invention provides a method for measuring the assembly thickness in a clamped-up condition. Measuring the assembly thickness while a temporary fastener applies a clamp-up force to a structure consisting of several panels, as possible by using the fastener grip length selector as in one embodiment of the present invention, may provide a more accurate determination of the fastener hole length than possible using prior art methods. Furthermore, calibrating the fastener grip length selector and the temporary fastener may allow a highly precise determination of the assembly thickness at the fastener hole, which is not possible by using prior art length measuring devices that do not allow calibration. Therefore, using the method for determination of the fastener grip length as in one embodiment of the present invention may reduce errors when selecting the correct permanent fastener and may reduce the need to replace a permanent fastener of incorrect length after installation.

Figure 2A:
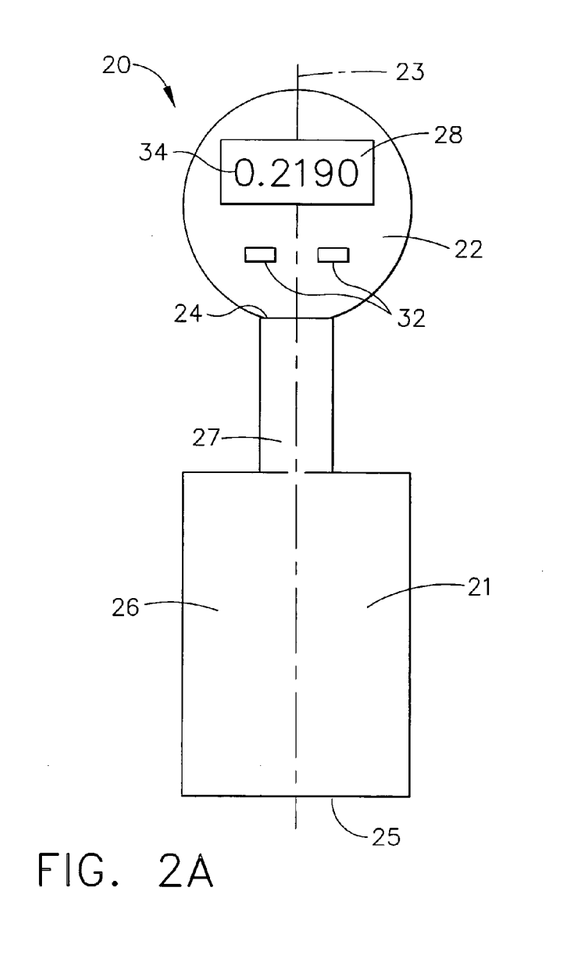
FIG. 2a is a front view of a fastener grip length selector according to one embodiment of the present invention.
Figure 2B:
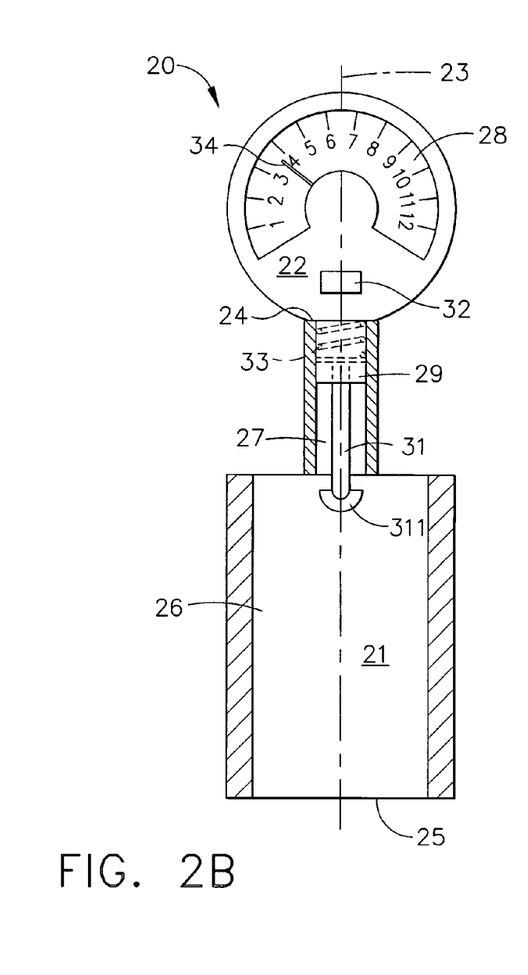
FIG. 2b is a cross sectional front view of a fastener grip selector according to one embodiment of the present invention.

Referring now to FIGS. 2a and 2b, a fastener grip length selector 20 is illustrated according to one embodiment of the present invention. The fastener grip length selector 20 may include a housing 21, and a gauge 22. The gauge 22 may be fitted with the housing 21. The housing 21 may have a cylindrical shape extending longitudinally along an axis 23. The housing 21 may have a top 24 and a bottom 25. The housing 21 may be divided into a first section 26 located at the bottom 25 and a second section 27 located at the top 24. The inside diameter of the first section 26 may be larger than the inside diameter of the second section 27. The inside diameter of the first section 26 may be large enough to surround a temporary fastener, for example, temporary fastener 10 shown in FIG. 1, which may be a Wedgelock™ temporary fastener manufactured by Monogram Aerospace Fasteners. The inside diameter of the second section 27 may be large enough to receive the gauge 22. The housing 21 may not be limited to a cylindrical shape as shown in FIGS. 2a and 2b. The housing 21 may have any shape extending along the axis 23 and may be manufactured as a single section.

Figure 3:
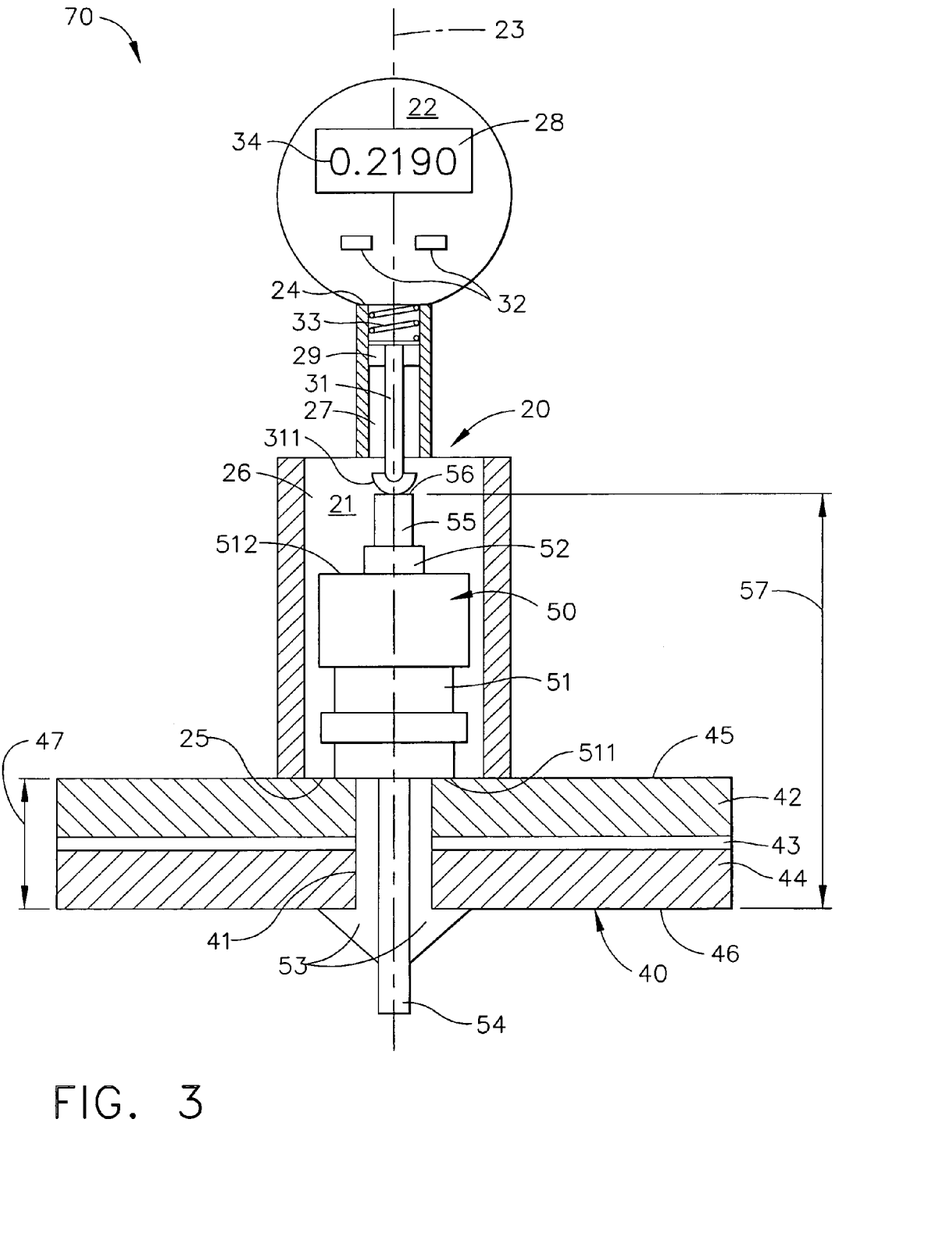
FIG. 3 is a front view of a system for measuring an assembly thickness in a clamped-up condition according to one embodiment of the present invention.

The gauge 22 may be, for example, a digital gauge (FIG. 2a), an analog gauge (FIG. 2b), a rotating micrometer head (not shown), and a sliding caliper (not shown). The gauge 22 may be in a fixed connection with the housing 21. The gauge 22 may include a spindle 31, a spring 33, a display 28, and a clamping shaft 29. The display 28 may be a digital display as illustrated in FIG. 2a or an analog display as illustrated in FIG. 2b. A gauge reading 34 may be displayed in the display 28. The gauge 22 may further include at least one button 32 to set or reset the display 28. The clamping shaft 29 of the gauge 22 may have a cylindrical shape, may extend along the axis 23, and may be in a fixed connection with the second section 27 of the housing 21. The clamping shaft 29 may further be part of the second section 27 of the housing 21. The gauge 22 may be attached to the housing 21 at the top 24 of the housing 21. The spindle 31 may be inserted in the clamping shaft 29. The spindle 31 may include a contact point 311 and may extend the clamping shaft 29 towards the bottom 25 of the housing 21 along the axis 23. The spindle 31 may be long enough such that the contact point 311 reaches into the first section 26 of the housing 21. The spindle 31 may freely move along the axis 23 within the clamping shaft 29 of the gauge 22. A spring 33 may be positioned above the spindle 31, for example, as shown in FIGS. 2b and 3, such that the spring 33 is in contact with the spindle 31. The spring 33 may be a coil spring as shown, but may not be restricted to be helical. The spindle 31 may compress the spring 33. Furthermore, it may be possible to use the spring 33 in a tension spring mechanism. In this case, the spring 33 may be in a fixed connection with the spindle 31 and the spring 33 may be stretched when the spindle 31 is moved during the measurement. The gauge 22 may translate the movement of the spindle 31 into a length that may be displayed in the display 28. The gauge reading 34 may be in correspondence with the degree of compression of the spring 33 and, therefore, with the amount of movement of the spindle 31 along axis 23, which may be translated into a length and displayed in the display 28. Consequently, the gauge 22 supported by the housing 21 may be used to measure a length.

Referring now to FIG. 3, a system 70 for measuring an assembly thickness 47 in a clamped-up condition is illustrated according to one embodiment of the present invention. The system 70 may include a fastener grip length selector 20 placed over an installed temporary fastener 50. The temporary fastener 50 may include a body 51, a nut 52, two hooked wires 53, a wedge 54, and a threaded shaft 55. The body 51 may have a cylindrical shape and may extend longitudinally along the axis 23 from a front end 511 to a back end 512. The threaded shaft 55 may be positioned inside the body 51 and may be movable along the axis 23. The nut 52 may be captive to the body 51 that is screwed onto the shaft 55. The nut 52 may extend the body 51 at the back end 512 along the axis 23. The nut 52 may be rotated in one direction to install the temporary fastener 50 and may be rotated in the opposite direction to remove the temporary fastener 50 while the body 51 is held stationary. The rotation of the nut 52 will move the threaded shaft up or down along the axis 23. When the shaft 55 is moved up, it may extend the body 51 at the back end 512. The two hooked wires 53 may be permanently attached to the shaft 55 and may extend the body 51 at the front end 511 along the axis 23. The wedge 54 may be in a fixed position with the body 51 and may extend the body 51 along the axis 23 at the front end 511 between the two hooked wires 53. The wedge 54 may push the hooked wires 53 apart when the shaft 55 is moved up and the hooked wires 53 are retracted. The temporary fastener 50 may be installed in a fastener hole 41 of an assembly 40.

The assembly 40, as illustrated in FIG. 3, may include a first panel 42, a second panel 43, a third panel 44, an outer mold line 45, and an inner mold line 46 and may have a thickness 47. The thickness 47 of the assembly 40 may by identical with the length of the fastener hole 41 and with the fastener grip length of the temporary fastener 50. For example, the assembly 40 may be an aircraft airframe assembly. The first panel 42 may be the outer mold line skin, the second panel 43 may be a sealer or a shim, and the third panel 44 may be the substructure. The assembly 40 may consist of at least two panels, such as panel 42 and panel 44. The fastener hole 41 may be cut through all three panels 42, 43, and 44. The fastener hole 41 may be, but is not limited to, a blind hole and may not be accessible from the inner side of mold line 46 of the assembly 40. The temporary fastener 50 may be installed into the fastener hole 41 and may hold the three panels 42, 43, and 44 in place until the assembly 40 is ready to be fastened permanently. While the temporary fastener 50 is installed in the assembly 40, a clamp-up force is applied and the assembly 40 will be in a clamped-up condition.

Once the temporary fastener 50 is installed, the housing 21 of the fastener grip length selector 20 may be placed over the temporary fastener 50 such that the contact point 311 of the spindle 31 contacts the shaft 55 of the temporary fastener 50, as shown in FIG. 3. The bottom 25 of the housing 21 may contact the outer mold line 45 of the assembly 40 around the fastener hole 41. While contacting the shaft 55 of the fastener 50, the spindle 31 may be moved along axis 23 and may compress the spring 33 in order to ascertain the distance 47 from the outer mold line 45 to the inner mold line 46 of the assembly 40. The gauge reading 34 displayed in the display 28 of the gauge indicates the distance 47. The shaft 55 may extend the body 51 of the temporary fastener 50 and may move the spindle 31 compressing the spring 33 of the gauge 22 depending on the thickness 47 of the assembly 40. The thicker the assembly 40, the more the shaft 55 may extend the body 51 of the fastener 50, the more the spindle 31 may be moved along the axis 23, and the more the spring 33 may be compressed. Since the total length 57 of the temporary fastener 50 may be fixed, it may be possible to determine the thickness 47 of the assembly 40 and, consequently, the fastener hole length and the fastener grip length. To increase the accuracy of the determination of the assembly thickness 47, the fastener grip length selector 20 may be calibrated using a reference standard 30 and the temporary fastener 50. The fastener grip length selector 20 may then be used to measure a distance, such as thickness 47 of the assembly 40, relative to the thickness 36 of the reference standard 30.

Figure 4:
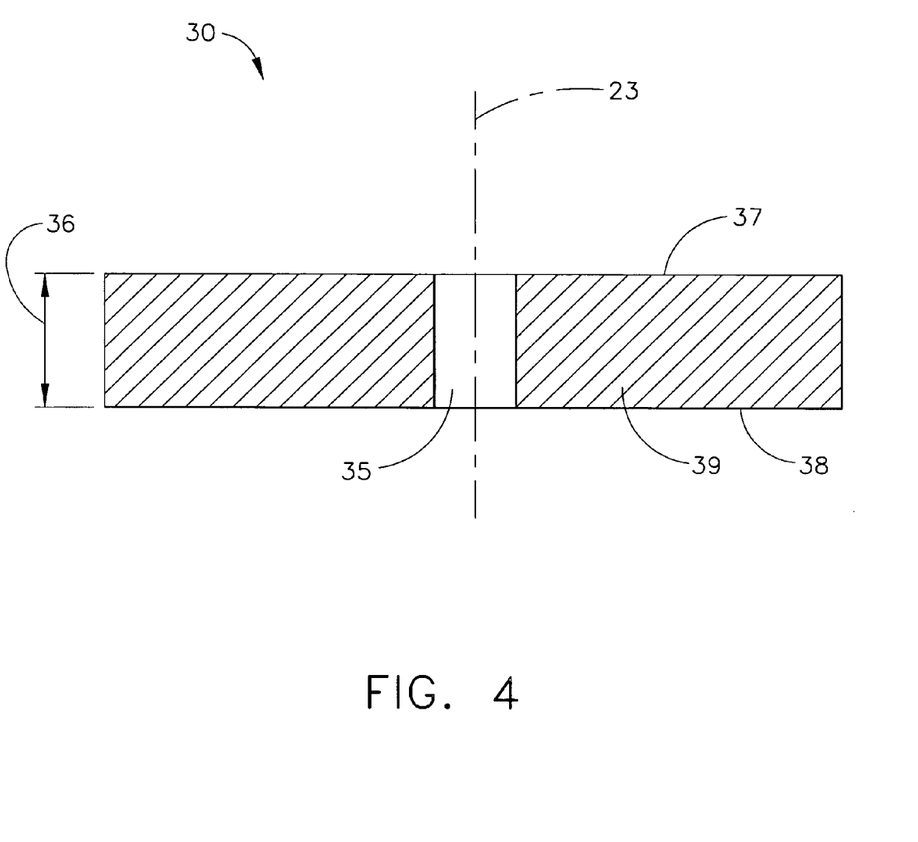
FIG. 4 is a cross sectional side view of a reference standard according to one embodiment of the present invention.

Referring now to FIG. 4, a reference standard 30 is illustrated according to an embodiment of the present invention. The reference standard 30 may include a structure 39 and a fastener hole 35. The structure 39 may have a bottom surface 38 and a top surface 37. The fastener hole 35 may be machined into the structure 39 and may extend along the axis 23 from the top surface 37 to the bottom surface 38 of the structure 39. The reference standard 30 may have a known thickness 36. The thickness 36 may be the distance from the top surface 37 to the bottom surface 38 of the structure 39. A temporary fastener 50 may be installed in the fastener hole 35. The temporary fastener 50 may apply a clamp-up force to the structure 39 of the reference standard 30. The fastener grip length selector 20 may be placed over the temporary fastener 50 such that the fastener grip length selector 20 may contact the top 56 of the temporary fastener 50 and the top surface 37 of the structure 39 of the reference standard 30. A length may be displayed in the display 28 of the gauge 22. Using the button 32, the display 28 may be set to zero or alternately preset to the thickness of the reference standard 30 enabling the thickness 47 of the assembly 40 to be measured quantitatively. By placing the calibrated grip length selector 20 over the temporary fastener 50 once the fastener 50 is installed in an assembly, for example, in assembly 40 (FIG. 3), the thickness of the assembly 40 may be deduced from the gauge reading 34 displayed in the display 28. The gauge reading 34 may then be converted to the corresponding fastener grip length of the fastener to be installed permanently. Optionally, the gauge reading 34 may be digitally converted to read out the corresponding fastener grip length enabling correct fastener selection. Furthermore, the gauge 22 may not include a gauge reading 34, but the length measured with the gauge 22 may be fed to an automated fastener delivery system that may use the information to deliver the correct size fastener. By using the reference standard 30 and the temporary fastener 50 to calibrate the fastener grip length selector 20, the thickness 47 of a structure 40 may be determined with an accuracy of about 1/1000 inch (i.e. 0.001"), whereas, the accuracy of prior art measuring devices, for example, a grip length gauge, used for the determination of the length 47 of a fastener hole is about 1/16 inch.

Figure 5:
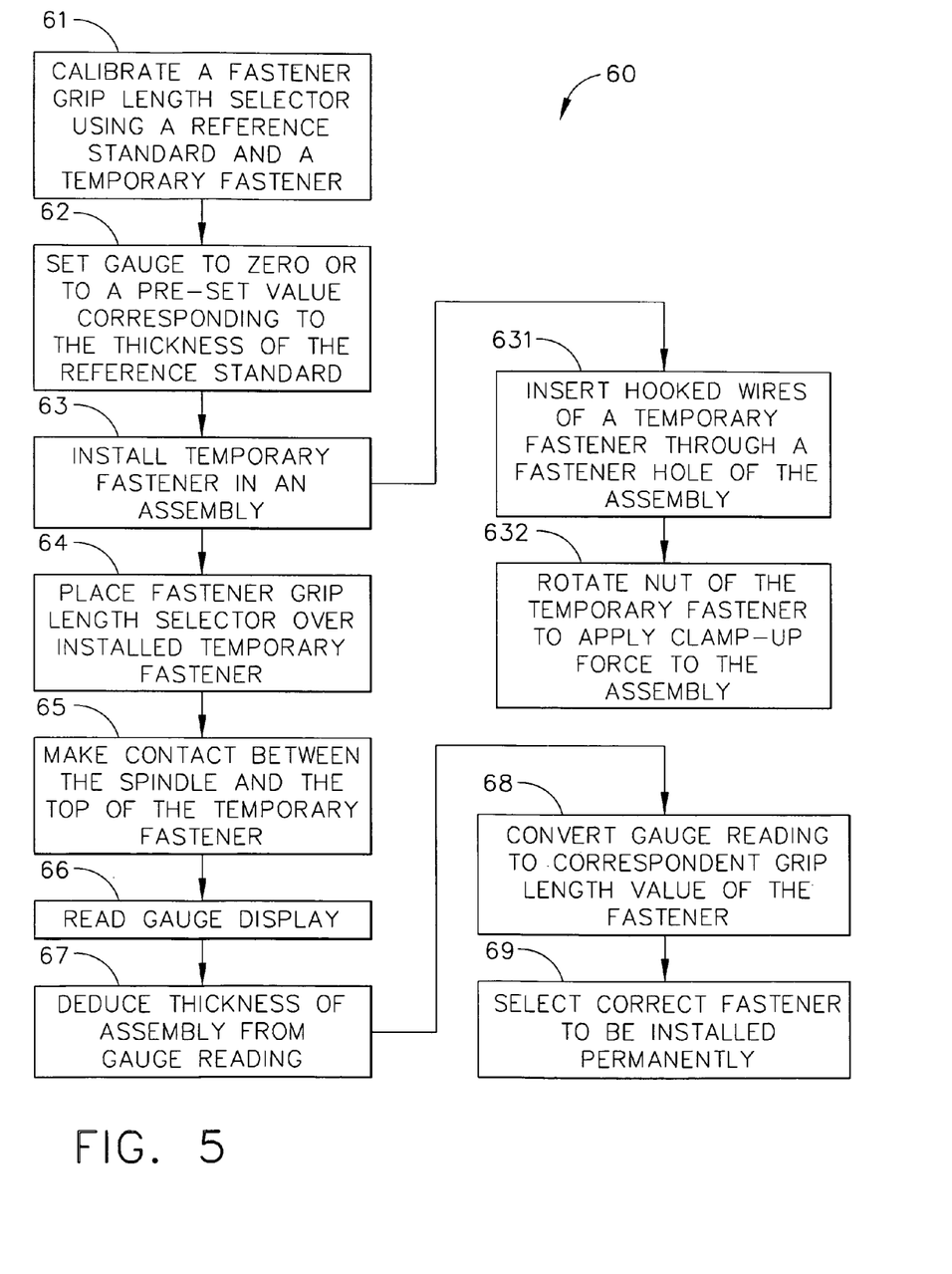
FIG. 5 is a flow chart of a method for precisely measuring the assembly thickness in a clamped-up condition according to another embodiment of the present invention.

Referring now to FIG. 5, a method 60 for precisely measuring the assembly thickness 47 in a clamped-up condition is illustrated according to another embodiment of the present invention. The method 60 may include the steps of: calibrating a fastener grip length selector 20 using a reference standard 30 and a temporary fastener 50 (step 61) and setting the display 28 of the gauge 22 to zero or to a pre-set value corresponding to the thickness 36 of the reference standard 30 (step 62). To calibrate the fastener grip length selector 20, the temporary fastener 50 may be installed in the fastener hole 35 of the reference standard 30 (FIG. 4) and the fastener grip length selector 20 may be placed over the temporary fastener 50. A length corresponding to the movement of the spindle 31 along the axis 23 may be displayed in the display 28 of the gauge 22. The display 28 may be set to zero or alternately preset to the thickness of the reference standard 30 enabling the thickness 47 of the assembly 40 to be measured quantitatively. In step 63, the temporary fastener 50 may be installed in an assembly 40. The installation of the temporary fastener 50 in the assembly 40 consisting of a plurality of panels, such as panels 42, 43, and 44, may include the steps of: inserting the hooked wires 53 through the fastener hole 41 (step 631), and rotating the nut 52 of the temporary fastener 50 to retract the hooked wires 53 until they contact the inner mold line 46 of the assembly 40 and to apply a clamp-up force to the assembly 40 (step 632) (shown in FIG. 3). After installation of the temporary fastener 50 in the assembly 40 in step 63, the calibrated fastener grip length selector 20 may be placed over the temporary fastener 50 in step 64 (FIG. 3). The fastener grip length selector 20 may be placed over the temporary fastener 50 such that the housing 21 is in contact with the outer mold line 45 around the fastener hole 41 as shown in FIG. 3. The spindle 32 may contact the top 56 of the temporary fastener 50 in step 65 (shown in FIG. 3). A length may now be read on the display 28 of the gauge 22 (step 66). The thickness 47 of the assembly 40 may be deduced from the gauge reading 34 in step 67. The method 60 may further include the steps of: converting the gauge reading 34 to a corresponding grip length value of the fastener (step 68), and selecting the correct fastener to be installed permanently using the determined grip length (step 69). The method 60 may be used for the precise determination of the thickness 47 of an assembly 40, such as an aircraft airframe assembly.

It should be understood, of course, that the foregoing relates to exemplary embodiments of the invention and that modifications may be made without departing from the spirit and scope of the invention as set forth in the following claims.

We claim:

1. A fastener grip length selector, comprising:
   an axis;
   a housing extending along said axis and including a first section and a second section; and
   a gauge fitted with said second section of said housing, said gauge including a spindle, wherein said spindle extends along said axis and reaches into said first section of said housing,
   wherein said gauge further comprises a clamping shaft being in a fixed connection with said housing, wherein said spindle is inserted in said clamping shaft and is movable along said axis within said clamping shaft.

2. The fastener grip length selector of claim 1, wherein said gauge further comprised a spring, wherein said spring is in contact with said spindle.

3. The fastener grip length selector of claim 2, wherein said spindle compresses said spring.

4. The fastener grip length selector of claim 1, wherein said housing has a cylindrical shape, a top, and a bottom, and wherein said first section is located at said bottom, and wherein said second section is located at said top.

5. The fastener grip length selector of claim 1, wherein the inside diameter of said first section is larger than the inside diameter of said second section.

6. The fastener grip length selector of claim 1, wherein the inside diameter of said first section is large enough to fit over a temporary fastener.

7. The fastener grip length selector of claim 1, wherein said gauge further includes a display.

8. The fastener grip length selector of claim 7, wherein said display is a digital display.

9. The fastener grip length selector of claim 7, wherein said display is an analog display.

10. A fastener grip length selector, comprising:
    an axis;
    a cylindrical housing extending along said axis and including a first section and a second section; and
    a gauge, including:
        a clamping shaft, wherein said clamping shaft has a cylindrical shape and extends along said axis, and wherein said clamping shaft is in a fixed connection with said second section of said housing;
        a spindle, wherein said spindle is inserted in said clamping shaft, wherein said spindle extends along said axis and reaches into said first section of said housing, and wherein said spindle is movable within said clamping shaft along said axis;
        a spring, wherein said spring is in contact with said spindle, and wherein said spring is compressed with said spindle; and
        a digital display, wherein said digital display displays a length corresponding to the movement of said spindle along said axis;
    wherein said gauge translates the movement of said spindle into a length displayed in said digital display.

11. The fastener grip length selector of claim 10, wherein said display includes a reset button.

12. The fastener grip length selector of claim 10, wherein a gauge reading is displayed in said display, and wherein said gauge reading corresponds to the length compression of said spring.

13. The fastener grip length selector of claim 10, wherein said housing is placed over a temporary fastener, wherein said temporary fastener is installed along said axis in an assembly and provides a clamp-up force to said assembly.

14. The fastener grip length selector of claim 10, wherein said housing includes a top and a bottom, and wherein said gauge is in a fixed connection with said top of said housing, and wherein said bottom of said housing is in contact with an outer mold line of said assembly.

15. The fastener grip length selector of claim 10, wherein said spindle further includes a contact point, wherein said contact point is in contact with said temporary fastener.

16. A calibration system, comprising:
    a reference standard; wherein said reference standard includes:
        a structure including a top surface and a bottom surface, wherein said structure has a known thickness measured from said top surface to said bottom surface; and
        a fastener hole machined into said structure, wherein said fastener hole extends from said top surface to said bottom surface of said structure;
    a temporary fastener installed in said fastener hole, wherein said temporary fastener includes a top; and
    a fastener grip length selector placed over said temporary fastener, wherein said fastener grip length selector contacts said temporary fastener at said top, and wherein said fastener grip length selector contacts said top surface of said structure;
    wherein said fastener grip length selector indicates a length.

17. The calibration system of claim 16, wherein said fastener grip length selector includes a display, and wherein said display is set to zero.

18. The calibration system of claim 16, wherein said display is set to the known thickness of said reference standard.

19. A system for measuring an assembly thickness in a clamped-up condition, comprising:
- an assembly including a plurality of panels, said assembly having an outer mold line and an inner mold line;
- a fastener hole machined into said assembly;
- a temporary fastener installed in said fastener hole, said temporary fastener including a top and providing a clamp-up force to said assembly holding said panels together; and
- a fastener grip length selector including a housing, and a gauge including a spindle, said fastener grip length selector being placed over said installed temporary fastener, wherein said housing is in contact with said outer mold line of said assembly, wherein said spindle is in contact with said top of said temporary fastener, and wherein said gauge translates the movement of said spindle into a length.

20. The system for measuring an assembly thickness in a clamped-up condition of claim 19, wherein said gauge is selected from the group of a digital gauge, an analog gauge, a rotating micrometer head, and a sliding caliper.

21. The system for measuring an assembly thickness in a clamped-up condition of claim 19, wherein said gauge further includes a display displaying said length, and wherein the distance from said outer mold line to said inner mold line of said assembly is deduced from said displayed length.

22. The system for measuring an assembly thickness in a clamped-up condition of claim 19, wherein the gauge reading displayed in said display is digitally converted to a corresponding fastener grip length.

23. The system for measuring an assembly thickness in a clamped-up condition of claim 19, further including a reference standard calibrating said fastener grip length selector.

24. A system for measuring the thickness of an aircraft airframe assembly in clamped-up condition, comprising:
- an aircraft airframe assembly including an outer mold line skin, a sealer, and a substructure, said assembly having an outer mold line, an inner mold line, and a thickness;
- a fastener hole machined into said aircraft airframe assembly, wherein said fastener hole is a blind hole not accessible from said inner mold line;
- a temporary fastener installed in said fastener hole, said temporary fastener including a top and providing a clamp-up force to said aircraft airframe assembly holding said outer mold line skin, said sealer, and said substructure together;
- a fastener grip length selector, comprising: a gauge including a display, a spindle, and a spring in connection with said spindle, and a housing supporting said gauge; and
- a reference standard having a known thickness and including a fastener hole, wherein said reference standard calibrates said fastener grip length selector;
- wherein said fastener grip length selector is placed over said installed temporary fastener, wherein said housing of said fastener grip length selector is in contact with said outer mold line of said assembly, wherein said spindle is in contact with said top of said temporary fastener, and wherein said spindle compresses said spring; and
- wherein said thickness of said aircraft airframe assembly is deduced from the gauge reading displayed in said display.

25. The system for measuring the thickness of an aircraft airframe assembly in clamped-up condition of claim 24, wherein said gauge further includes a cylindrical clamping shaft being in a fixed connection with said housing, wherein said spindle is inserted in said clamping shaft and is movable within said clamping shaft, and wherein said spring is inserted in said clamping shaft to be in contact with said spindle.

26. The system for measuring the thickness of an aircraft airframe assembly in clamped-up condition of claim 24, wherein said thickness of said aircraft airframe assembly is used to select the correct fastener to be installed permanently in said fastener hole.

27. A method for precisely measuring a thickness of an assembly in clamped-up condition, comprising the steps of:
- calibrating a fastener grip length selector using a reference standard and a temporary fastener;
- installing said temporary fastener in an assembly having a thickness;
- placing said calibrated fastener grip length selector over said installed temporary fastener;
- making contact between said fastener grip length selector, said temporary fastener, and said assembly;
- reading a length displayed on said fastener grip length selector; and
- deducing said thickness of said assembly from said reading.

28. The method of claim 27, further comprising the step of:
- clamping said assembly by providing a clamp-up force to said assembly with said temporary fastener.

29. The method of claim 27, further comprising the steps of:
- converting said reading to a correspondent grip length value of said fastener; and
- selecting a correct fastener to be installed permanently in said assembly.

30. The method of claim 27, further comprising the steps of:
- contacting said installed temporary fastener with a spindle of said fastener grip length selector;
- moving said spindle while placing said calibrated fastener grip length selector over said installed temporary fastener;
- displaying a gauge reading in a display of said gauge that corresponds to said movement of said spindle.

* * * * *